United States Patent [19]

Trumbull

[11] Patent Number: 5,584,697
[45] Date of Patent: Dec. 17, 1996

[54] SIMULATOR SYSTEM HAVING A SUSPENDED PASSENGER PLATFORM

[75] Inventor: Douglas Trumbull, Southfield, Mass.

[73] Assignee: Ridefilm Corporation, South Lee, Mass.

[21] Appl. No.: 271,004

[22] Filed: Jul. 5, 1994

[51] Int. Cl.⁶ ........................................... G09B 9/00
[52] U.S. Cl. .................. 434/58; 434/69; 434/44; 434/29
[58] Field of Search ...................... 434/43, 44, 55, 434/58, 38, 30, 29, 40, 69, 62; 472/59, 60, 61, 130; 352/132

[56] References Cited

U.S. PATENT DOCUMENTS

| | | | |
|---|---|---|---|
| 838,137 | 12/1906 | Plummer | 472/60 |
| 1,789,680 | 1/1931 | Gwinnett . | |
| 3,233,508 | 2/1966 | Hemstreet | 434/44 X |
| 3,542,934 | 11/1970 | Warhurst et al. . | |
| 3,577,655 | 5/1971 | Pancoe . | |
| 3,577,659 | 5/1971 | Kail . | |
| 3,597,857 | 8/1971 | Akister et al. | 434/58 |
| 3,645,011 | 2/1972 | Callanen . | |
| 3,865,430 | 2/1975 | Tanus | 297/217 |
| 3,923,300 | 12/1975 | Tanus | 272/18 |
| 4,066,256 | 1/1978 | Trumbull | 272/18 |
| 4,113,223 | 9/1978 | Kakizaki | 248/430 |
| 4,276,030 | 6/1981 | Radice | 434/62 |
| 4,303,236 | 12/1981 | Czarnecki | 272/18 |
| 4,343,610 | 8/1982 | Chou | 434/58 |
| 4,352,664 | 10/1982 | Morrison et al. | 434/14 |
| 4,478,407 | 10/1984 | Manabe | 272/18 |
| 4,492,356 | 1/1985 | Taniguchi et al. | 248/346 |
| 4,576,577 | 3/1986 | Lam et al. | 434/58 |
| 4,634,384 | 1/1987 | Neves et al. | 434/40 X |
| 4,641,255 | 2/1987 | Hohmann | 364/522 |
| 4,710,129 | 12/1987 | Newman et al. | 434/55 |
| 4,752,065 | 6/1988 | Trumbull et al. | 272/18 |
| 4,753,596 | 6/1988 | Hart et al. | 434/29 |
| 4,798,376 | 1/1989 | Trumbull et al. | 272/18 |
| 4,846,686 | 7/1989 | Adams | 434/69 |
| 4,856,771 | 8/1989 | Nelson et al. | 272/18 |
| 4,868,771 | 9/1989 | Quick et al. | 364/578 |
| 4,874,162 | 10/1989 | Trumbull et al. | 272/18 |
| 4,879,849 | 11/1989 | Hollingsworth, III et al. . | |
| 4,978,299 | 12/1990 | Denne | 434/58 |
| 4,993,673 | 2/1991 | Hirose | 248/178 |
| 5,006,072 | 4/1991 | Letovsky et al. | 434/61 |
| 5,018,973 | 5/1991 | Alet et al. | 434/62 |
| 5,060,932 | 10/1991 | Yamaguchi | 272/36 |
| 5,071,352 | 12/1991 | Denne | 434/29 |
| 5,109,952 | 5/1992 | Starks et al. | 182/63 |
| 5,242,306 | 9/1993 | Fisher | 434/43 X |

FOREIGN PATENT DOCUMENTS

| | | |
|---|---|---|
| 2257967 | 8/1975 | France ................. 434/55 |
| 2677155 | 12/1992 | France . |
| WO90/03627 | 4/1990 | WIPO . |
| WO93/01577 | 1/1993 | WIPO . |

*Primary Examiner*—Gene Mancene
*Assistant Examiner*—Jeffrey A. Smith
*Attorney, Agent, or Firm*—McCormick, Paulding & Huber

[57] ABSTRACT

A simulator system for use in providing an event simulation to a passenger includes an inverted motion base having six degrees of freedom. An audio-visual display mechanism is included for providing a sequence of audio and visual images to the passenger. A motion base controller generates actuator drive signals. A system controller provides the command signals to the motion base controller in synchronization with the presentation of the audio-visual images. The motion base is characterized by an passenger platform which is suspended from a series of spars. Motion is accomplished by means of displaceable actuators arranged in a substantially orthogonal relationship. The present system has compact dimensions and minimize loads impressed to the surrounding structure; thereby allowing the present system to be incorporated into existing commercial structures with minimal modification.

11 Claims, 9 Drawing Sheets

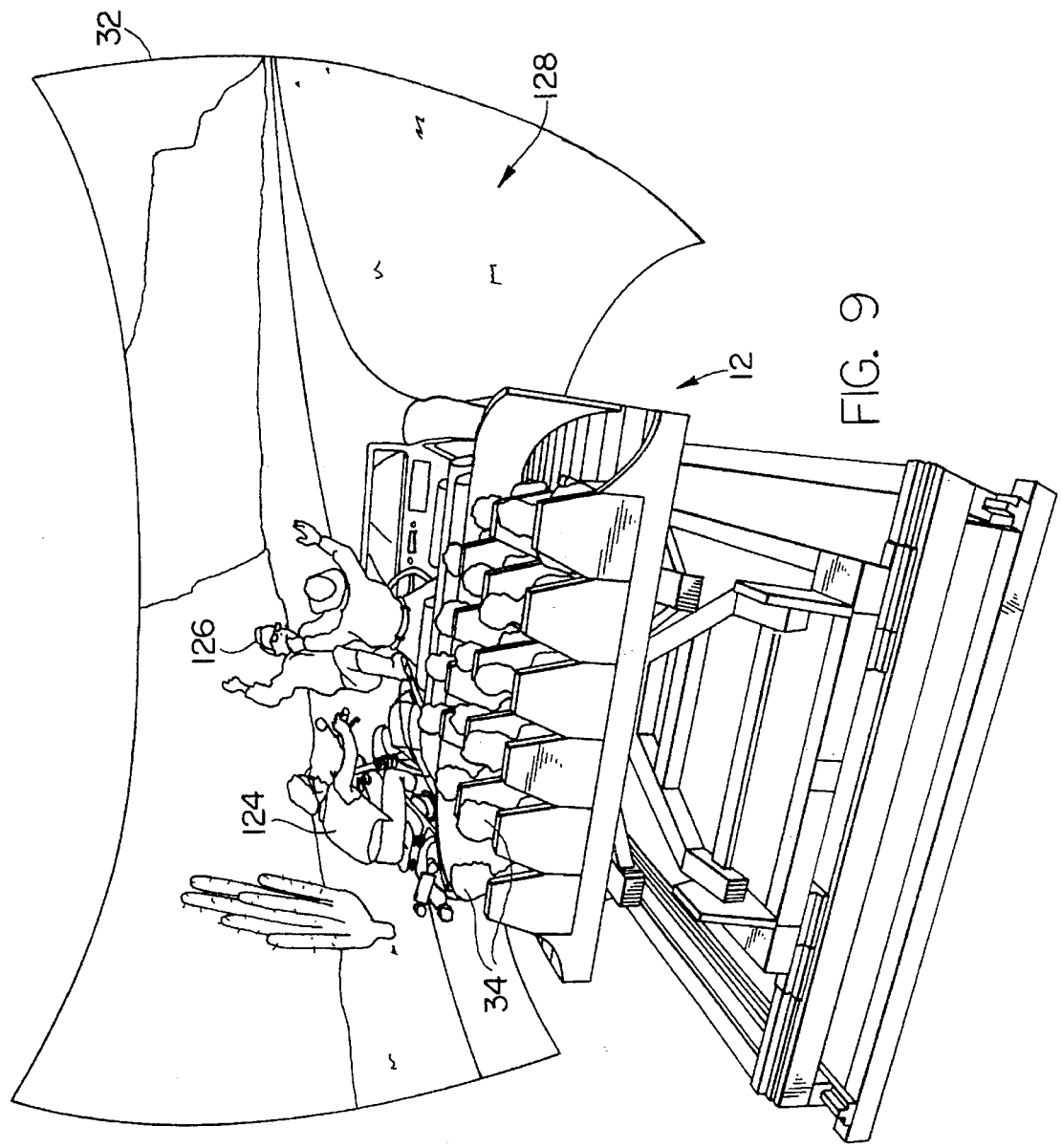

SIMULATOR SYSTEM HAVING A SUSPENDED PASSENGER PLATFORM

TECHNICAL FIELD

The present invention relates to simulators generally and in particular to a simulator system characterized by an inverted motion base which has a passenger platform that hangs from a support.

CROSS REFERENCE TO RELATED APPLICATION

Some of the matter contained herein is disclosed and claimed in U.S. Pat. No. 5,199,875 entitled "A Method and Apparatus for Generating Supplemental Motion in a Simulator" and U.S. patent applications Ser. Nos. 08/014/117 (pending), and 08/014/330 (U.S. Pat. No. 5,433,670), respectively entitled "A Simulator System Having An Orthogonal Motion Base" and "A Compact Simulator System Theater", all of which are incorporated herein by reference.

BACKGROUND OF THE INVENTION

Simulators are well known in the art having found applications in such diverse fields as aircraft pilot training and amusement rides. In general, known simulators include a motion base having one or more seats and a plurality of programmable actuators which displace the motion base from a rest position in accordance with a predetermined sequence of drive signals. Synchronized with the motion base movement is a motion picture illuminated on a projection screen directly attached to the motion base or in the immediate environment. A controller is sometimes included to provide for the synchronization between the motion base displacements and the accompanying audio-visual work. Alternatively, the audio-visual images and motion base control signals are simultaneously recorded in media if, for example, the resultant program is to be repeatedly used.

Known simulators include the amusement ride apparatus disclosed in U.S. Pat. Nos. 4,752,065 and 4,798,376 which has a motion base that moves and tilts passengers viewing a motion picture. A plurality of passenger holding frames is provided which are all synchronously moved by separate sets of actuators. A film is shown to passengers on a stationary screen. The passenger holding frames are each pivoted up and down on a beam which is supported only by two largely vertical actuators while two pairs of links or arms limit the movement of the beam.

U.S. Pat. No. 3,923,300 and 3,865,430 to Tanus disclose a theater chair that comprises a support structure and a chassis having a back, arms and a seat moveably affixed to the chassis. There is a provision for movement in the vertical and horizontal directions. The Tanus chair comprises part of a overall system wherein control signal information is coded on motion picture film. The chair is operated synchronously with the playing of the motion picture to enhance the realism of the movie.

An example of a game machine is provided by U.S. Pat. No. 4,478,407 to Manabe. The '407 machine includes a motion base wherein a seat is pivotally mounted at perpendicular hinge points on a planar platform with motion in a perpendicular third dimension being accomplished by actuators configured therewith. The '407 device is designed to generate roll pitch and yaw sensations, as well as vertical movement.

A motion system for flight simulation is disclosed in U.S. Pat. 3,645,011 to Callanen. The '011 flight simulation system includes three spaced-apart hydraulic actuators for imparting translation to respectively associated reciprocal pistons. One of the actuators is positioned in a vertical plane containing the longitudinal or roll axis of a grounded flight trainer and the other two actuators are spaced from the roll axis at vertical positions on either side transverse to that axis.

Another amusement ride is disclosed in U.S. Pat. No. 4,066,256. The '256 amusement ride creates the illusion that the passengers are seated in a rapidly maneuvering vehicle by applying forces to the passengers in synchronism with the display of a motion picture image. The '256 apparatus includes a passenger holding frame that has three locations resting on hydraulic rams that can tilt the frame or move it up and down with a film projector and viewing screen connected to the frame to move with it.

U.S. Pat. No. 4,846,686 discloses a motor vehicle simulator with multiple images. The '686 simulator is characterized by a conventional front looking "driver point of view" image which would be seen by a driver looking through a windshield. Another section of the images displayed with the '686 simulator includes images that were recorded by one or more cameras which were facing rearward. An individual in the simulator is simultaneously presented with a forward looking "driver point of view" image and with other images representing what would be seen by the driver looking towards the rear of the simulator vehicle.

U.S. Pat. No. 4,276,030 discloses a pivotable vehicle simulator with one end of an upper frame carrying an passenger station of a simulated vehicle. The upper frame is mounted to a base frame which is pivotal about a vertical axis. A dummy steering wheel is provided at the passenger's station and is linked to pivot the upper frame. Combined rotary and translation bearings support the other end of the upper frame on a shaft carried on a base frame to accommodate the pivotal movement about the vertical axis and also to provide a small upward pitching of the upper frame during pivoting of the upper frame in either direction from a central position so that gravity acts to restore the upper frame and steering wheel to centered conditions.

Other known simulator systems rely primarily on rotational motion including the amusement apparatus of U.S. Pat. No. 5,060,932, the video simulation apparatus of U.S. Pat. No. 4,856,771 and the simulation device of U.S. Pat. No. 4,710,129. All of the above are geared towards simulating simultaneous roll, yaw and pitch or combinations thereof. Some of the above are also configured to be used with projected images for viewing by passengers as part of the simulation. The amusement ride of U.S. Pat. No. 4,066,256 is characterized by three substantially vertical hinged actuators which are moved in a controlled manner to displace a top mounted horizontal platform, thereby simulating acceleration in the plane of the platform.

Moreover, existing motion bases are large and tall, resulting in simulator systems that will not fit in buildings of a standard design. Commercial buildings typically have a maximum height of about 14.5 ft. Known simulator systems must, therefore, be housed in specially fabricated buildings. For amusement applications, new buildings must be constructed or existing buildings must be heavily modified, adding still more costs to the simulator system. Moreover, existing simulator system which have a reduced height are quite massive, with substantial displaceable weight. It would be desirable to have a simulator system which generates a more realistic simulation of an event in a simple and cost efficient manner by low displaceable weight but which is capable of being used in commercial buildings of conventional design. The present invention is drawn towards such a simulator system.

SUMMARY OF THE INVENTION

An object of the present invention is to provide a simulator system characterized by a suspended motion base.

Another object of the present invention is to provide a system of the forgoing type having a reduced weight, thereby presenting lower kinetic loads presented to the building structure.

Another object of the present invention is to provide a simulator system of the foregoing type having an audio visual display synchronized with the movement of the motion base, allowing for movement about a nodal point located a screen surface.

Yet another object of the present invention is to provide a simulator system of the foregoing type which can employ a variety of motion actuators.

Another object of the present invention is to provide a simulator system of the foregoing type having built in support for a projector and sound system.

According to the present invention, a motion base for use with a simulator system having a system controller that generates command signals for presentation of a sequence of audio-visual image signals to a simulator system passenger synchronously with the movement of the motion base includes a first support frame extending upward from a support surface; a second support frame spaced from said first frame and extending upward from said support surface; a third support frame spaced from said first and second frames and extending upward from said support surface. There is a first spar extending between said first and second support frames and received thereby at upper surfaces of said first and second frames; a second spar extending from a central location of said first spar to said third support frame and received thereby at a third frame upper surface. A passenger platform is adapted to receive ride simulation apparatus upon an upper platform surface, said platform having a plurality of actuator pick up points. There is also a plurality of actuator means for effecting linear displacement of said platform relative to one another in response to received actuator drive signals, each of said actuators having an end affixed to said spars and a distal end downwardly extending to corresponding ones of said platform actuator pick up points so as to allow for substantial rectilinear movement thereof and a coupling means configured with said actuator means for allowing angular movement of each of said actuator means and said platform at a corresponding pick up point.

According to another aspect of the present invention, a simulator system for use in providing an event simulation to an passenger thereof includes a motion base having a first support frame extending upward from a support surface; a second support frame spaced from said first frame and extending upward from said support surface; a third support frame spaced from said first and second frames and extending upward from said support surface. There is a first spar extending between said first and second support frames and received thereby at upper surfaces of said first and second frames; a second spar extending from a central location of said first spar to said third support frame and received thereby at a third frame upper surface. A passenger platform is adapted to receive ride simulation apparatus upon an upper platform surface, said platform having a plurality of actuator pick up points. A plurality of actuator means for effecting linear displacement of said platform relative to one another in response to received actuator drive signals is included, each of said actuators having an end affixed to said spars and a distal end downwardly extending to corresponding ones of said platform actuator pick up points so as to allow for substantial rectilinear movement thereof. There is a coupling means configured with said actuator means for allowing angular movement of each of said actuator means and said platform at a corresponding pick up point; an audio-visual display means for providing a sequence of audio and visual image signals to the simulator system passenger; a motion base controller for generating said actuator drive signals in response to received command signals and a system controller for providing said command signals to said motion base controller in synchronization with the presentation of said audio-visual image signals.

BRIEF DESCRIPTION OF THE DRAWINGS

FIG. 9 is a rear, perspective illustration of the motion base and screen of FIG. 2

DESCRIPTION OF THE PREFERRED EMBODIMENT

Figure 1:
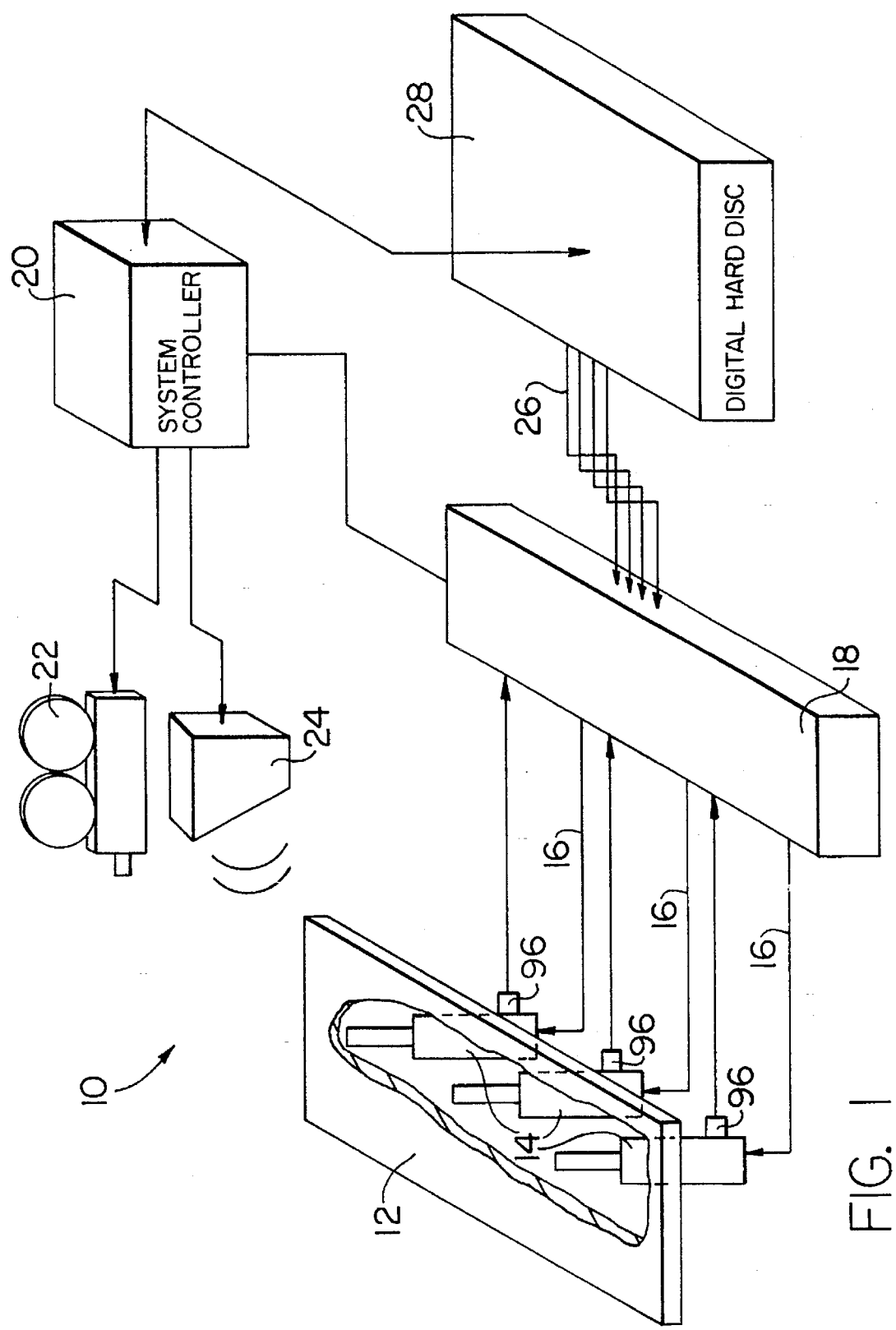
FIG. 1 is a simplified block diagram illustrating a simulator system provided according to the present invention.

Referring now to FIG. 1 there is shown a block diagram illustrating a simulator system 10 provided according to the present invention. The system 10 comprises a motion base 12 which includes a plurality of actuators generally indicated at 14. The actuators receive drive signals on lines 16 from a motion base controller 18. The motion base includes at least one seat for a simulator system passenger.

The simulator system includes a system controller 20 that provides control signals to an audio-visual system indicated schematically by projector 22 and speaker 24 as well as a viewing screen, not shown in the figure. The audio-visual images are encoded in a single film medium in a known manner. Command signals are provided on lines 26 from a storage medium such as a digital hard disc 28 to the motion base controller. The actuator drive signals are configured to be synchronously applied to the motion base in accordance with the preprogrammed audio-visual images. As noted above, the motion base is preferably comprised of a plurality of hydraulic actuators, each of which is respectively configured with a servo valve (not shown) for receiving drive signals to displace the actuators a selected amount at a selected rate. Both the hydraulic actuators and the servo valves are of a known type. Electromagnetic or pneumatic actuators may be equivalently substituted with appropriate modifications to hardware and control software.

Figure 2:
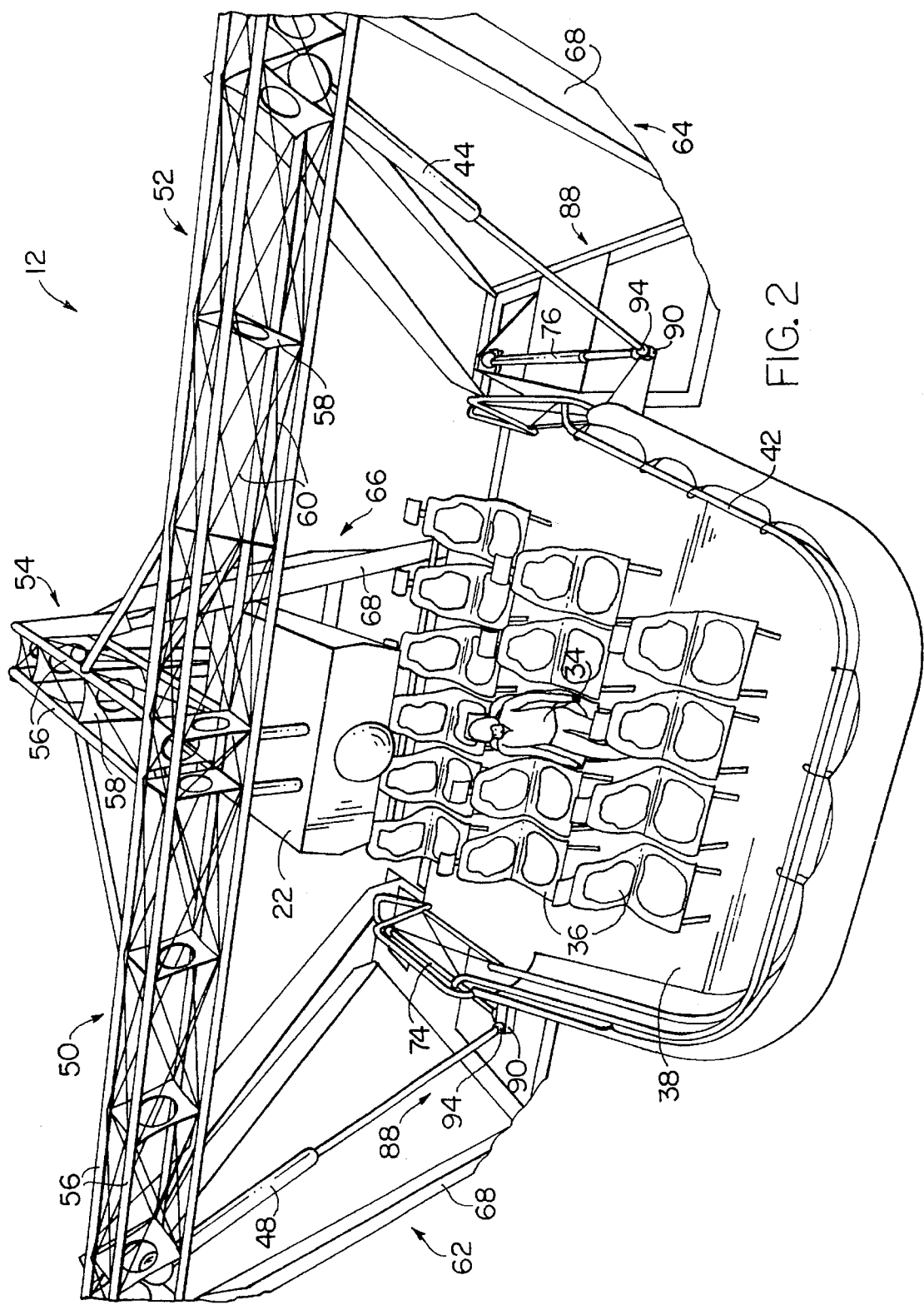
FIG. 2 is a front, perspective illustration of a portion of a motion base included in the simulator system of FIG. 1.
Figure 3:
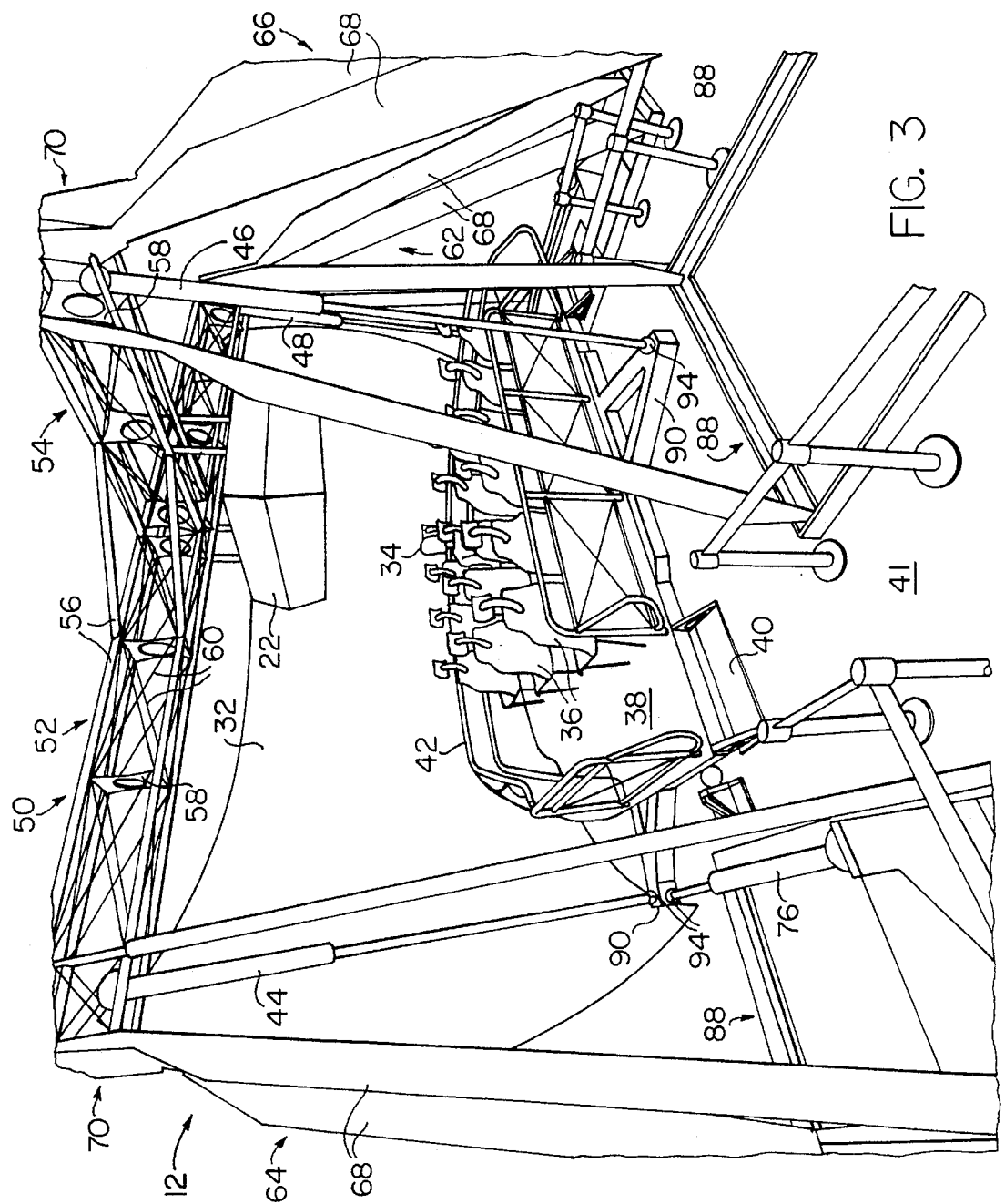
FIG. 3 is a rear, perspective illustration of the motion base of FIG. 2.
Figure 4:
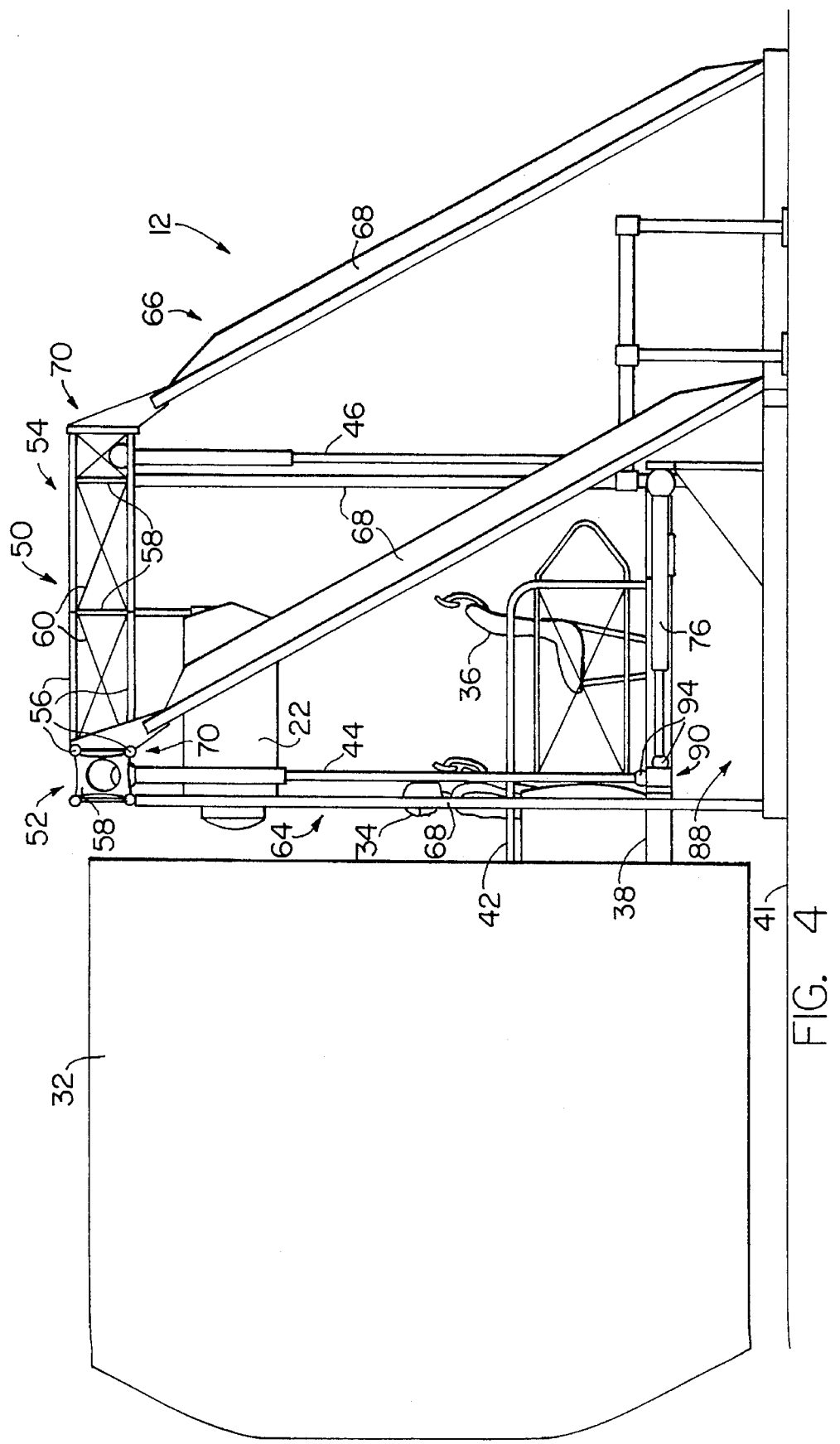
FIG. 4 is a side illustration of the motion base of FIG. 2.

Referring now simultaneously to the several views afforded by FIGS. 2–7, there is shown in perspective a portion of the motion base 12. FIG. 2 is a front, perspective illustration of a portion of the motion base, while FIG. 3 is a rear, perspective illustration of the same. FIG. 4 is a side illustration of the motion base. As seen in the several figures, an image is projected on screen 32 by the projector. The screen is curved, with the preferred geometry being spherical with an included angle of 180 degrees. There is no limitation as to the film format that can be used with the present invention. Thirty-five ram, eight perforation (8 perf) Vista Vision film format at 48 frames per second (fps) is used in the preferred embodiment. Passengers 34 are placed in seats 36 on a platform 38. The preferred system seats approximately 15 individuals. The passenger platform in its rest position is level with stairs 40 and is raised above floor 41. The projector 22 is positioned above the motion base in a central location above the passengers. A rail 42 demarcates the outer perimeter of the platform and blocks the view of the floor and system machinery.

The passenger platform is suspended by means of a plurality of vertical actuators 44, 46 and 48 from a gantry assembly 50. The gantry assembly comprises spars 54 which are at right angles to one another in a plane above the floor. The spars themselves are each comprised of a plurality of beams 56 and lateral supports 58; and, in some embodiments, may additionally comprise cable supports 60 for added strength. The spars are supported above the floor by left, right and rear frame assemblies 62, 64 and 66. Each frame assembly includes a plurality of frame members 68 which extend from the floor to the attachments points 70 on the spars. The projector is hung from the spars to allow illumination of the screen in the view of the passengers.

Figure 5:
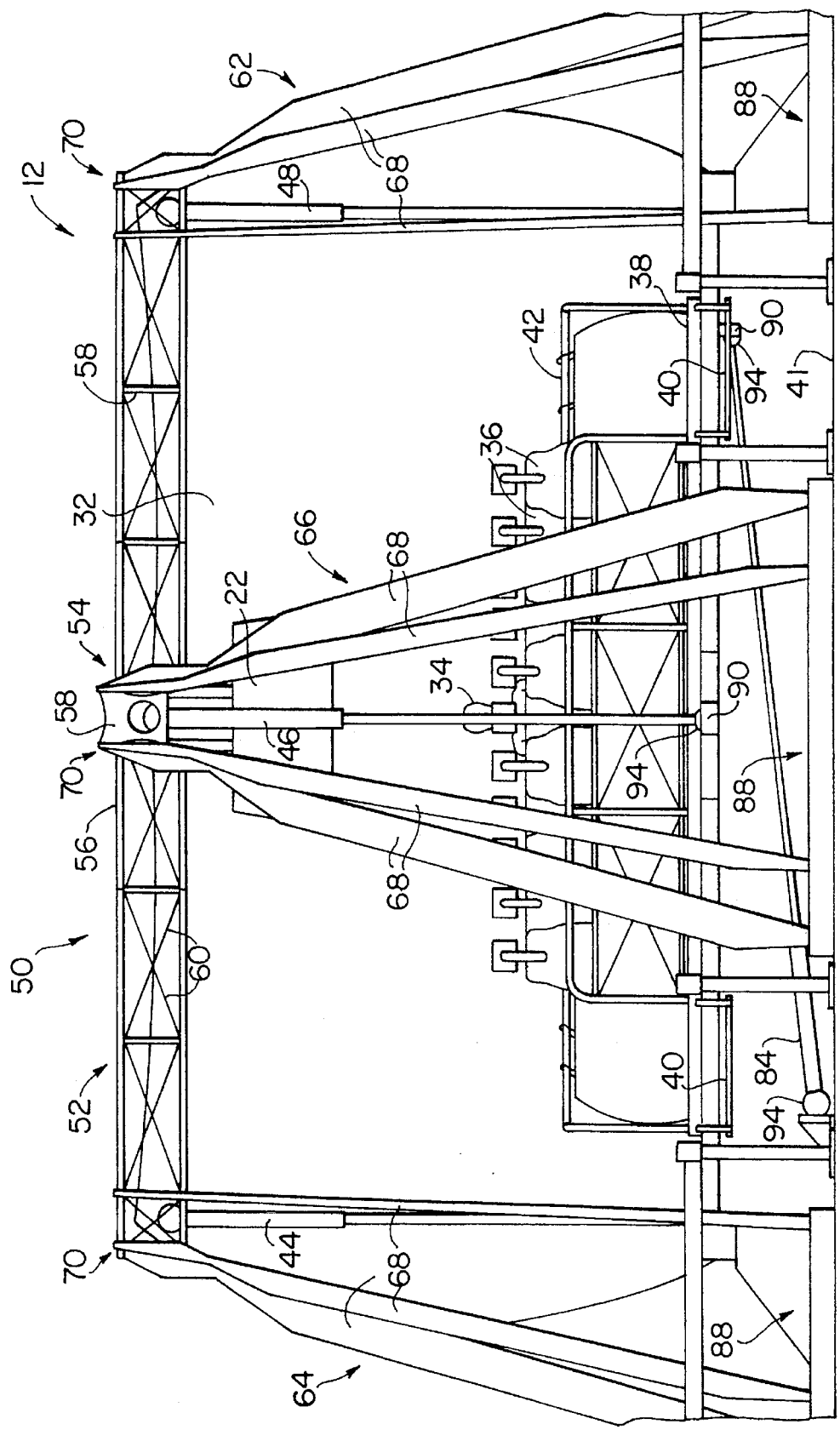
FIG. 5 is an illustration of the rear of the motion base of FIG. 2.
Figure 6:
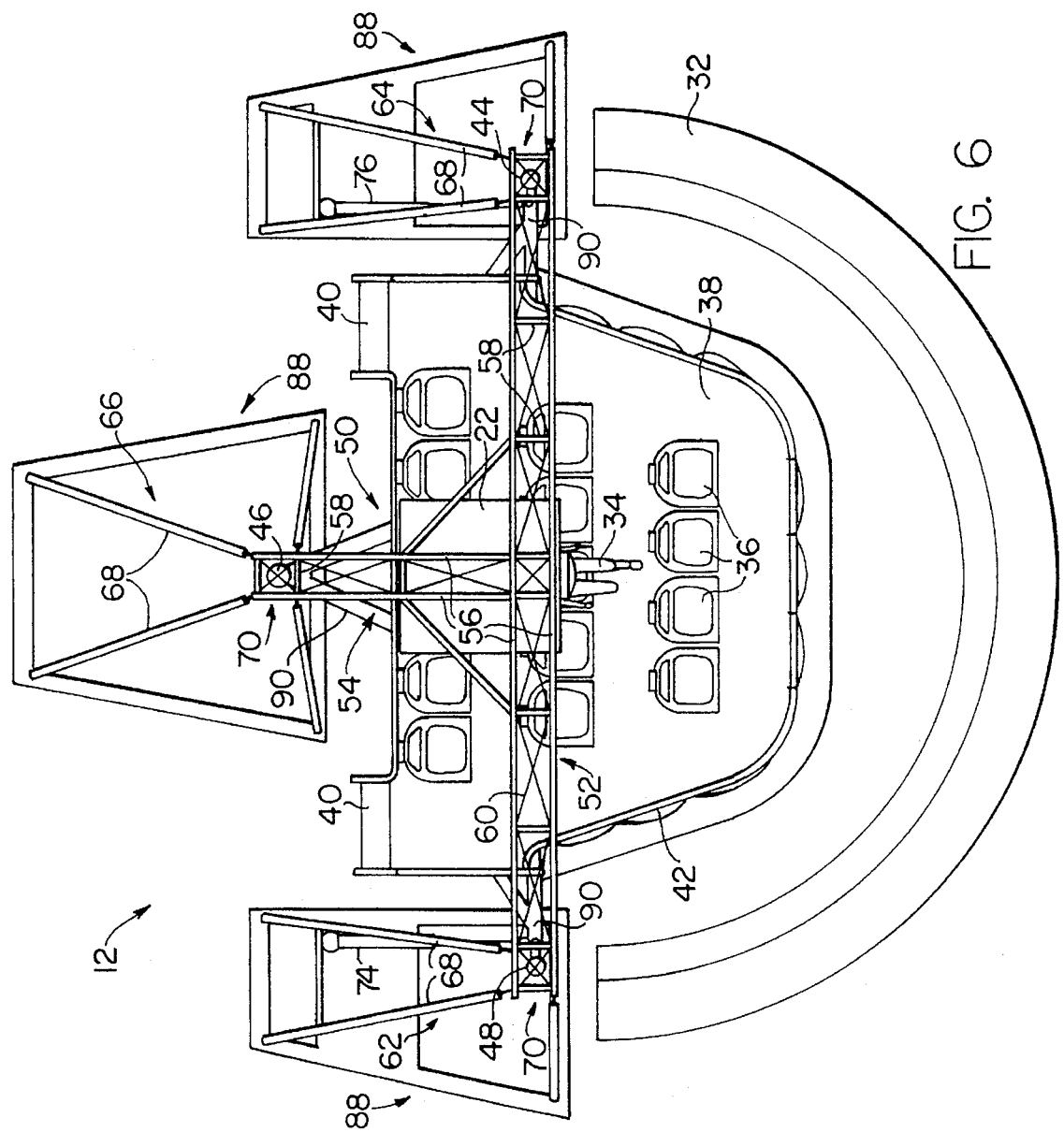
FIG. 6 is a top view of the motion base of FIG. 2.
Figure 7:
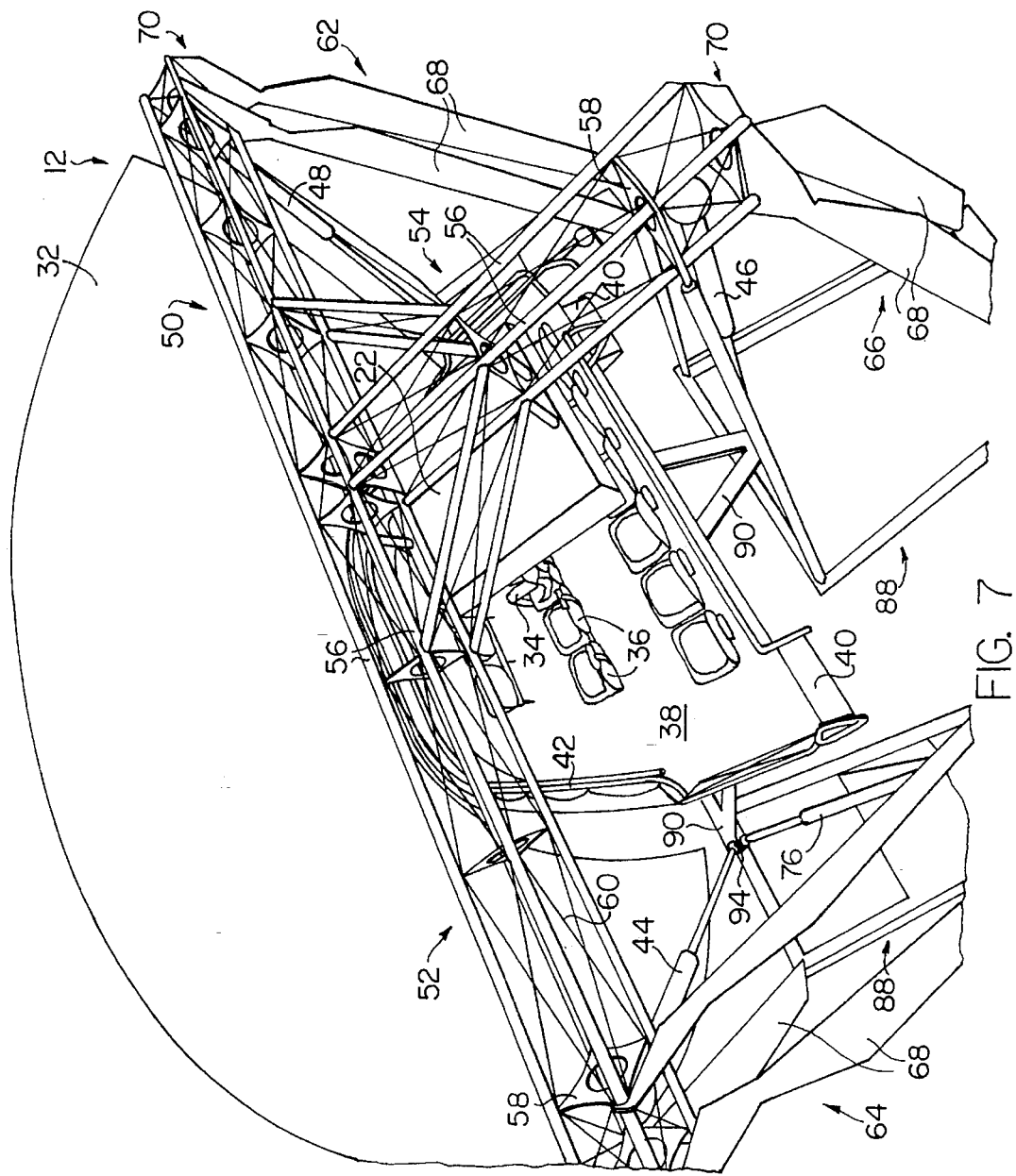
FIG. 7 is a top perspective illustration of the motion base of FIG. 2.

FIGS. 5–7 are additional views of the motion base 12. FIG. 5 is an illustration of the rear of the motion base, while FIG. 6 is a top view. FIG. 7 is a top perspective illustration of the motion base. The simulator system 10 also includes left and right lateral actuators 74, 76 configured to provide fore and aft movement of the platform, parallel with the Y axis. The actuators are positioned in a plane parallel to the floor and substantially perpendicular to vertical actuators. Lateral motion in the X direction is provided along the X axis by actuator 84 which extends from the floor to the bottom surface of the passenger platform. The lateral actuator 84 is positioned to be at right angles with respect to the fore-aft actuators 74, 76 and to be in substantially the same plane as the vertical actuators 44, 46, 48.

Each of the frame assemblies further comprises a plurality of locating members 88 which are positioned on the floor. The several actuators are coupled to their respective pick up points 90 by universal joints 94 to allow for relative movement between the actuator and the platform. The platform has a rest position at approximately one half of the overall throw of the actuators, which is approximately 30 inches in the preferred embodiment.

In some regards the present invention is similar to an inverted 6 DOF base with the passenger platform hanging and therefore virtually resting on the floor. The passenger platform which may comprise other hardware to emulate a "vehicle" is constructed in a manner similar to a light plane wing. The platform can be lifted and tilted in any manner subject to the confines of the space and the throw of the rams. The rams preferably have universal joints at both ends. To stabilize the platform, the rams working in tandem assert fore-aft or Y axis motion while inhibiting yaw motion. Finally the ram beneath the platform is oriented transversely and provides X axis motion only.

All motions provided by these rams contain a radial component since they are fixed at one end and moving at the other. Purely orthogonal motion can be achieved by judicious configuration of ram movement via appropriate software algorithms. However, since the rams are oriented at roughly ninety degrees, the present system provides substantially more orthogonally than do conventional 6 DOF bases where the rams are often at 30–60 degree angles to one another.

The present invention is also distinguished by the unique attribute of foreground action on the screen by providing orthogonal motion which keeps the passengers oriented constantly towards the center of the screen and not yawing/pitching/rolling off of the screen image. In addition, the present system can generate an even wider range of motion by means of appropriate control signals while keeping the passengers view fixed on a single point, if necessary. This is similar to nodal point correction used in photography which keeps the camera's lens exactly centered while the body of the camera can gyrate freely around that point. The present system provided for control signal to the motion base in conjunction with the presentation of audio and visual images that create a nodal point located at the screen surface where there may be the image of a character or vehicle interior which is desired to appear fixed in location. This is an improvement over "pure" orthogonal systems which creates small relative image to platform displacement.

The present simulator system, therefore, avoids angular motion of that which constitutes the frame of reference of the passengers. In some embodiments of the present invention the passengers frame of reference is established by the vehicle (e.g., auto or boat) in which the passengers are supposedly transported. Such embodiments would include a motion base as detailed above along with the vehicle interior surrounding the passengers. The movement of the interior of the car or prow of the boat would be automatically restricted to exclusively orthogonal motion since the interior is fixed to the motion base. The visual images presented in conjunction with the movements of the motion base are unrestricted, and include angular motion, linear orthogonal motion and/or combinations thereof.

However; that which comprises the frame of reference of the passengers can include a portion of the visual image presented to the passengers on the screen. In general, the visual image can be divided into an image subportion which comprises part of the passengers frame of reference and the remainder image. This feature of the present invention marks an important departure from the prior art and allows for new simulator systems heretofore not available.

Figure 8:
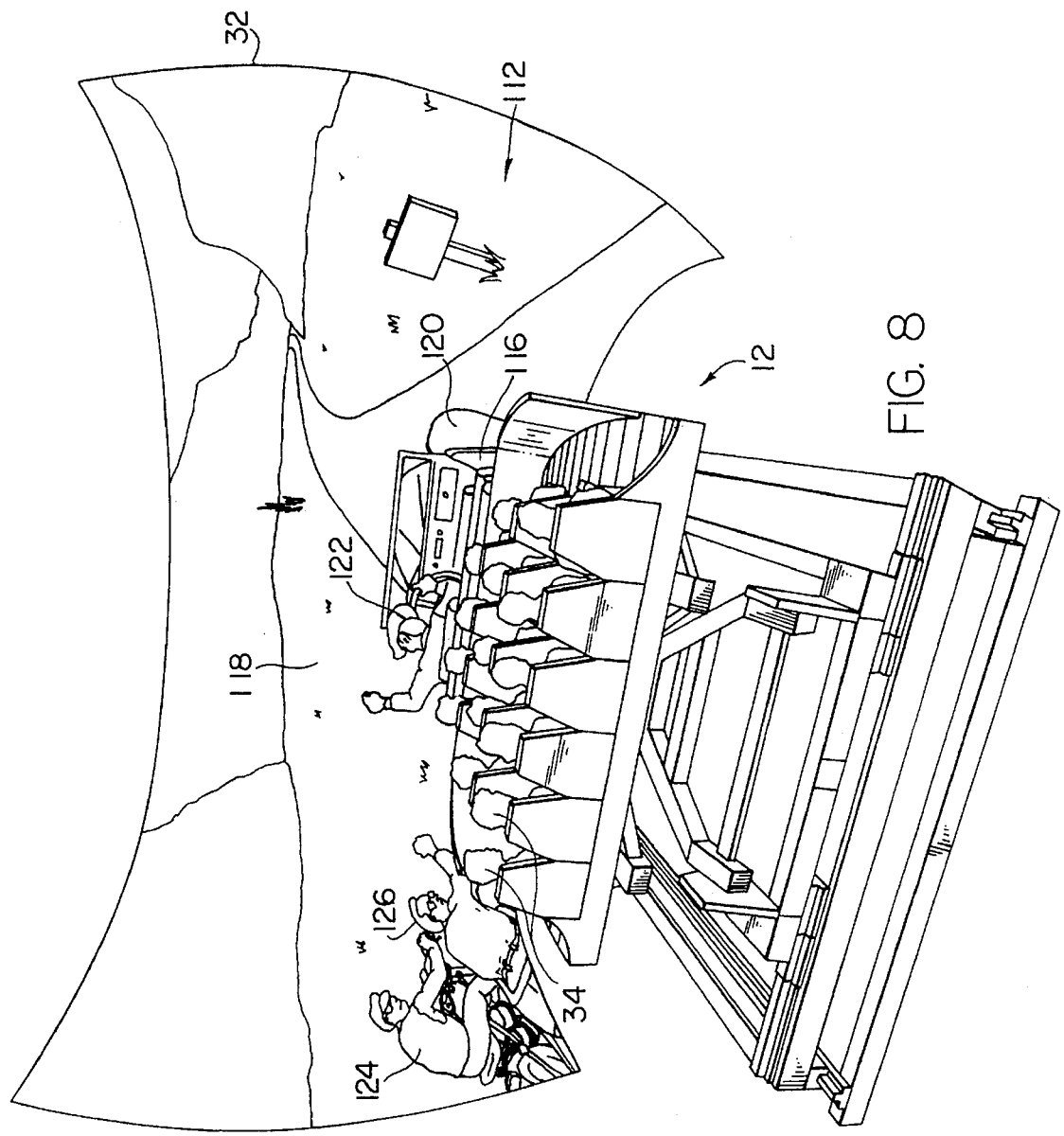
FIG. 8 is a rear, perspective illustration of the motion base and screen of FIG. 2.

Referring now to FIG. 8 there is shown a simplified schematic illustration of a visual image 112 projected by the simulator system of the present invention. The image is projected on the screen for viewing by simulator passengers 34. In the preferred embodiment the visual image comprises a foreground image 116 with the remainder corresponding to background image 118.

The foreground and background images have different relationships with the simulator passengers. For example, the foreground image on the screen includes the automobile 120 as well as the driver 122. Since the foreground image is filmed in concert with the motion base, it is constrained to have only orthogonal motion. As noted above, angular motion of the foreground image relative to the occupants would induce an inappropriate relationship with the simulator passengers and possibly lead to motion sickness. Consequently, the driver and automobile will not undergo angular motion relative to the passengers. In contrast, the motorcyclists 124 and 126 comprise part of the background. This does not mean that the foreground image and its separate components undergo the same motion, nor does it means the passengers and foreground image move simultaneously. Rather, the constraint imposed by the present invention is only that the movement of the foreground image that comprises part of the frame of reference of the passengers be limited to orthogonal three axis motion.

The present simulator system has the capability to have live action in the foreground as part of the simulator passengers frame of reference. Moreover, visual elements of this foreground action can transit between foreground and background (and back again). Illustrated in FIG. 9 is a second image 128 provided with the present system that is shown subsequent to the image of FIG. 8. As depicted, the motorcyclist 126 climbs into the auto to fight the driver. Accordingly, the driver may be seen to transit from the foreground to the background during the fight sequence. Alternatively, the motorcyclist could be filmed to be part of the foreground while inside the auto. Thereafter, the motorcyclist (or driver) could leave the cab of the auto (voluntarily or forcibly) and become part of the background image. When part of the foreground image, a character is depicted in accordance with the rules governing foreground image motion such that only orthogonal movement is permitted. When part of the remainder background image, the character motion is unrestricted.

To achieve this effect, the foreground image is photographed so that its physical relationship with the vehicle which it is associated remains fixed together. In this way the foreground image will remain in correct relationship with the motion base at all times. Alternative embodiments may have a portion of the background (i.e. horizon) also comprise part of the passenger frame of reference.

The moving mass is comprised of the platform and passengers only. The platform can be built of lightweight composite or aluminum. The overall configuration of the preferred embodiment is an overhead "T" shaped truss supported by angular braces providing a partially triangulated structure. As a result, the load is distributed over a larger floor space than in conventional designs. Projector support is a prefabricated part of the structure. Hydraulic and electrical lines are preassembled onto the truss and struts, thereby easing installation and lowering overall costs. Light-tight and soundproof panels offer easy conversion to a standalone configuration.

In the preferred embodiment, the motion base has 15 seats and occupies a 30 foot by 30 foot floor area, with an overall height of less than 15 feet as measured from the floor; thereby providing adequate ceiling clearance in buildings of standard commercial design. The screen is preferably curved and has a 180 degrees of circular curvature. The preferred film format is 35 mm 8 per vista vision at 48 frames per second (48 fps). The present motion base has 6 degrees of freedom and is characterized by a minimum number of moving parts with many identical and interchangeable components. The system is lightweight and can be easily installed.

The present invention provides significant advantages over the 6 degrees of freedom (6 DOF) motion bases of the prior art as well as the orthogonal motion base as disclosed and claimed in the above referenced U.S. patent applications. Some of these advantages are detailed herein and stem from the fact that the "hanging" or suspended characteristic of the present motion base lowers both displaceable weight and passenger platform height.

Conventional 6 DOF motion bases entail very tall configurations with the passenger platform located several feet above the ground. As a result, the simulator system height is in excess of the industry standard 15 feet, requiring a specially constructed building. Also, since motion bases of the present type can seat more than a dozen passengers, they can be large and have great mass. The larger the mass which must be accelerated (and decelerated) during operation, the greater the force required to do the same and the stronger the componentry must be to accomplish the job.

A conventional 6 DOF motion base inherently extends from the floor a substantial distance to accommodate the system's motion. The greater the magnitude of the actuator displacement, the larger the height of the motion base passenger platform from the fixed floor. Not only does this increased height deleteriously effect the simulator system theater packaging requirements as noted above, the increased height raises the needed strength of the componentry because the magnitude of the forces exerted on the actuator/joint combination scales with the larger effective moment arm caused by the increased platform height.

Also, conventional 6 DOF motion bases are most often characterized by a triangular actuator configuration with each actuator attached to a point on a fixed surface by means of a universal joint and at a nodal point on the motion base. For several purposes, including system control, a simulator motion base is designed to have a preferred range of movement which forms a cube of selected dimension (e.g., 30 inches). To accomplish the desired displacement cube, the total throw provided for the motion base actuators has to be much larger in each dimension in prior art designs.

Prior art 6 DOF motion bases are capable of exceeding the preferred displacement by substantial margin in each direction. It is well known that the probability of actuator or control failure is large. In a common failure mode, an actuator will move to an extreme position, either fully extended or contracted. This fact significantly effects the design of the motion base in that it requires very large safety margins be included in the physical envelope to avoid the motion base (and its occupants) from crashing in to close to objects or structures, such as the projector, screen or wall.

This drawback is obviated by the present invention The present 6 DOF base motion base has a minimum/maximum excursion which is substantially coextensive with the preferred movement. As a result, much of the extra space reserved for an anticipated component failure can be eliminated. This feature of the present invention provides two benefits. First, the screen and projector can be brought well within the proximity of the motion base, thereby enhancing the simulators occupant's experience. Secondly, the overall volume needed to contain simulator system is drastically reduced. The reduction of the volume needed to house simulator systems provided by the present invention is a significant advantage over the prior art.

Some prior art motion bases have a nested configuration in which frames, actuators and other ancillary componentry are moved together during displacement. This configuration is exemplified by the orthogonal motion base disclosed in the above-referenced pending U.S. patent application. A consequence of this design is that the robustness of the componentry required increases with the number of degrees of freedom since the displaceable mass increases as well.

The combination of these two factors increases the magnitude of the loads which must be borne by the supporting floor and structure. Consequently, the potential sites for the simulator system location must be reinforced as compared to conventional commercial buildings, thereby raising overall costs.

In order to construct any motion base which could be installed within a low clearance building (approximately 15 feet) and one which would not generate excessive floor loading, more must be done than to employ a prior art motion base with a minimum overall weight. This can only be done if the moving mass of the system is minimized. Each reduction in displaceable weight allows for the use of corresponding smaller, less expense ancillary componentry, such as actuators and the alike, allowing for a further reduction in cost. The present invention is characterized by an inverted configuration in which the passenger platform is suspended rather than supported directly on moveable frame assemblies. The configuration allows for 6 degrees of freedom and a substantially cubic displacement envelope, but a minimum weight since only the passenger platform is displaced during operation.

The motion base controller is preferably a proportional/integral/derivative (PID) type controller as is marketed by the Allen Bradley Corporation The motion base controller generates actuator drive signals in response to command signals received from either the system controller or an external source such as a hard disc recorder 28 in the preferred embodiment. The motion base is preferably operated in closed loop fashion, with each actuator having a sensor 96 for generating feedback signals corresponding to the measured actuator displacement. These feedback signals are used by the motion base controller to insure a maximum error between the commanded position of the actuator and its actual displacement is not exceeded during operation. A value of about 80 Hz. has been selected as the actuator drive signal frequency upper bound as a safety feature to prevent that controller from attempting to operate the motion base in a manner which could cause unintended oscillations.

For a given set of audio-visual images or motion picture in the preferred embodiment, a corresponding sequence of command signals must be generated for the motion base controller in repetitive programming situations, such as in an amusement ride. Typically the command signals for the motion base controller are programmed using an Anitech motion controller manufactured by the Anitech Corporation. This controller comprises algorithms which allow for manual selection of individual actuator displacements synchronized with corresponding segments of the motion picture. In addition, algorithms such as executed by PCFX software provided by the Persistence of Vision Company, Culver City, Calif. are used to provide for specific desired transient responses of the motion base. The PCFX program or its equivalent provides for enhanced editing capabilities as well as command signal generation utilities for sine wave generation, actuator displacement smoothing and key frame splicing.

The motion base must have each programmed actuator position synchronized with the audio-visual images being presented to the passengers at a particular time. Synchronization can be accomplished in any of a number of ways. In the preferred embodiment, the SMPTE time code is provided to the system controller from the motion picture and is provided to controller software such as is available from the above-referenced Anitech Corporation and auxiliary control apparatus such as a Studio 3 sequence and a Macintosh brand computer or equivalent. Software associated with the system controller synchronizes the command signals with the associated motion picture frame(s). The synchronized command signals are then preferably stored in the digital hard disc. The system controller also comprises software of a known type to enable synchronized playback of the command signals with the presentation of the motion picture to the passengers of the simulator system. For example, minimum acceleration is achieved when the command signal sequence is selected to approximate a Gaussian function. Similarly, other mathematical algorithms can be used to generate maximum acceleration. In the system 10 this is accomplished using the PCFX program noted above. The speed of displacement of the actuator is programmed in view of the motion base controller cutoff frequency.

Similarly, although the invention has been shown and described with respect to a preferred embodiment thereof, it would be understood by those skilled in the art that other various changes, omissions and additions thereto maybe made without departing from the spirit and scope of the present invention.

I claim:

1. A motion base for use with a simulator system having a system controller that generates command signals for presentation of a sequence of audio-visual image signals to a simulator system passenger synchronously with the movement of the motion base, said motion base comprising:

a first support frame extending upward from a support surface a second support frame spaced from said first frame and extending upward from said support surface;

a third support frame spaced from said first and second frames and extending upward from said support surface;

a first spar extending between said first and second support frames and received thereby at upper surfaces of said first and second frames;

a second spar extending from a central location of said first spar to said third support frame and received thereby at a third frame upper surface;

a passenger platform adapted to receive ride simulation apparatus upon an upper platform surface, said platform having a plurality of actuator pick up points;

a plurality of actuator means for effecting linear displacement of said platform relative to one another in response to received actuator drive signals, each of said actuators having an end affixed to one of said spars and a distal end downwardly extending to a corresponding one of said platform actuator pick up points so as to allow for substantial rectilinear movement thereof; and a coupling means configured with said actuator means for allowing angular movement of each of said actuator means and said platform at a corresponding one of said pick up points.

2. The motion base of claim 1 further comprising a motion base controller for generating said actuator drive signals in response to received system controller command signals.

3. The motion base of claim 1 wherein said actuator means comprises hydraulic actuators.

4. The motion base of claim 1 wherein said actuator means comprises electric motors.

5. A simulator system for use in providing an event simulation to an passenger thereof, said simulator system comprising:

a motion base having a first support frame extending upward from a support surface;

a second support frame spaced from said first frame and extending upward from said support surface;

a third support frame spaced from said first and second frames and extending upward from said support surface;

a first spar extending between said first and second support frames and received thereby at upper surfaces of said first and second frames;

a second spar extending from a central location of said first spar to said third support frame and received thereby at a third frame upper surface;

a passenger platform adapted to receive ride simulation apparatus upon an upper platform surface, said platform having a plurality of actuator pick up points;

a plurality of actuator means for effecting linear displacement of said platform relative to one another in response to received actuator drive signals, each of said actuators having an end one of said spars and a distal end downwardly extending to a corresponding one of said platform actuator pick up points so as to allow for substantial rectilinear movement thereof;

a coupling means configured with said actuator means for allowing angular movement of each of said actuator means and said platform at a corresponding one of said pick up points;

an audio-visual display means for providing a sequence of audio and visual image signals to the simulator system passenger;

a motion base controller for generating said actuator drive signals in response to received command signals; and a system controller for providing said command signals to said motion base controller in synchronization with the presentation of said audio-visual image signals.

6. The simulator system of claim 5 wherein said motion base controller further comprises a proportional-integral-derivative (PID) controller.

7. The simulator system of claim 5 wherein said audio-visual display image sequence is further recorded in a motion picture medium.

8. The simulator system of claim 5 further comprising feedback sensors configured with each of said actuators for providing, to said motion base controller, signals indicative of the measured displacement of said corresponding actuator.

9. The simulator system of claim 5 wherein said audio visual display means further comprises:

a means for generating a sequence of audio signals to be received by said passenger;

a means for generating a sequence of visual image signals to be received by said passenger, said visual image signals having a sub-set thereof comprising a visual frame of reference for said passenger;

a means for generating a sequence of said visual image subset signals to be received by said passenger such that said subset image is constrained to move only along three orthogonal axes;

a means for generating a sequence of said actuator drive signals; and a means for synchronizing the presentation of said actuator drive signals with said visual image subset signals and with the remainder of said visual image signals and said audio signals.

10. The simulator system of claim 5 wherein said visual image further comprises a visual element and wherein said visual image subset generating means further comprises a means for transiting said visual image element between said visual image subset and the remainder of said visual image signals.

11. The simulator system of claim 5 wherein said audio visual display means further comprises:

a means for generating a sequence of audio signals to be received by said passenger;

a means for generating a sequence of background visual image signals to be received by said passenger;

a means for generating a sequence of foreground visual image signals to be received by said passenger such that said foreground image is constrained to move only along three orthogonal axes;

a means for generating a sequence of actuator drive signals; and a means for synchronizing the presentation of said actuator drive signals with said foreground visual image signals along with said background visual image signals and said audio signals.

* * * * *

UNITED STATES PATENT AND TRADEMARK OFFICE
CERTIFICATE OF CORRECTION

PATENT NO. : 5,584,697
DATED : December 17, 1996
INVENTOR(S) : Douglas Trumbull

It is certified that error appears in the above-indentified patent and that said Letters Patent is hereby corrected as shown below:

Column 5, line 13, please delete "ram" and substitute --mm--; line 25, after "spars", please insert --52--.

Claim 5:

Column 11, line 19, after "end", please insert --affixed to--.

Signed and Sealed this

Seventeenth Day of June, 1997

Attest:

BRUCE LEHMAN

Attesting Officer

Commissioner of Patents and Trademarks